US008839750B2

(12) United States Patent
Brennan et al.

(10) Patent No.: US 8,839,750 B2
(45) Date of Patent: Sep. 23, 2014

(54) SYSTEM AND METHOD FOR CONTROLLING HYDRAULIC PRESSURE IN ELECTRO-HYDRAULIC VALVE ACTUATION SYSTEMS

(75) Inventors: Daniel G. Brennan, Brighton, MI (US); Craig D. Marriott, Clawson, MI (US); Joel Cowgill, White Lake, MI (US); Matthew A. Wiles, Royal Oak, MI (US); Kenneth James Patton, Howell, MI (US)

(73) Assignee: GM Global Technology Operations LLC

( * ) Notice: Subject to any disclaimer, the term of this patent is extended or adjusted under 35 U.S.C. 154(b) by 373 days.

(21) Appl. No.: 12/910,212

(22) Filed: Oct. 22, 2010

(65) Prior Publication Data
US 2012/0097121 A1   Apr. 26, 2012

(51) Int. Cl.
F01L 1/34 (2006.01)
F01L 9/02 (2006.01)
F02D 13/06 (2006.01)
F02D 13/02 (2006.01)
F01L 13/00 (2006.01)
F02D 13/08 (2006.01)

(52) U.S. Cl.
CPC ......... *F02D 13/0207* (2013.01); *F01L 13/0005* (2013.01); *F01L 2800/08* (2013.01); *Y02T 10/18* (2013.01); *F02D 13/08* (2013.01); *F01L 9/02* (2013.01); *F01L 13/0015* (2013.01)
USPC ................. 123/90.16; 123/198 F; 123/90.12; 701/105

(58) Field of Classification Search
USPC ...................... 123/90.12, 90.15–90.18, 195 F
See application file for complete search history.

(56) References Cited

U.S. PATENT DOCUMENTS

| | | | |
|---|---|---|---|
| 1,703,858 A | 9/1920 | Banner | |
| 3,157,166 A | 11/1964 | MacNeill | |
| 3,926,159 A * | 12/1975 | Michelson et al. | 123/90.11 |
| 4,000,756 A * | 1/1977 | Ule et al. | 137/596.17 |
| 4,009,695 A | 3/1977 | Ule | |
| 4,044,652 A | 8/1977 | Lewis et al. | |
| 4,459,946 A | 7/1984 | Burandt | |
| 4,807,517 A | 2/1989 | Daeschner | |
| 5,267,541 A * | 12/1993 | Taguchi et al. | 123/198 F |
| 5,373,818 A | 12/1994 | Unger | |
| 5,421,545 A | 6/1995 | Schexnayder | |
| 5,546,222 A | 8/1996 | Plaessmann et al. | |
| 5,572,961 A | 11/1996 | Schechter et al. | |
| 5,638,781 A | 6/1997 | Sturman | |
| 5,881,689 A | 3/1999 | Hochholzer | |
| 6,109,284 A | 8/2000 | Johnson et al. | |
| 6,112,711 A | 9/2000 | Shimizu et al. | |
| 6,263,842 B1 | 7/2001 | De Ojeda et al. | |
| 6,374,784 B1 | 4/2002 | Tischer et al. | |
| 6,505,584 B2 | 1/2003 | Lou | |
| 6,688,267 B1 | 2/2004 | Raghavan | |

(Continued)

*Primary Examiner* — Thomas Denion
*Assistant Examiner* — Steven D Shipe

(57) ABSTRACT

A control system for an engine includes a first lift control module and a second lift control module. The first lift control module increases lift of M valves of the engine to a predetermined valve lift during a period before disabling or re-enabling N valves of the engine. The second lift control module decreases the lift of the M valves to a desired valve lift during a period after enabling or re-enabling the N valves of the engine, wherein N and M are integers greater than or equal to one.

19 Claims, 5 Drawing Sheets

(56) References Cited

U.S. PATENT DOCUMENTS

| | | | |
|---|---|---|---|
| 6,691,652 B2 * | 2/2004 | Kammerdiener et al. | 123/90.12 |
| 6,739,293 B2 * | 5/2004 | Turner et al. | 123/90.12 |
| 6,748,916 B2 * | 6/2004 | Schaefer-Siebert | 123/198 F |
| 6,810,844 B2 * | 11/2004 | Sellnau | 123/90.16 |
| 6,868,811 B2 * | 3/2005 | Koro et al. | 123/90.16 |
| 6,886,510 B2 | 5/2005 | Sun et al. | 123/90.12 |
| 6,981,475 B2 * | 1/2006 | Turquis | 123/90.15 |
| 7,025,326 B2 * | 4/2006 | Lammert et al. | 251/29 |
| 7,278,392 B2 * | 10/2007 | Zillmer et al. | 123/299 |
| 7,580,779 B2 * | 8/2009 | Zillmer et al. | 701/22 |
| 7,644,688 B2 * | 1/2010 | Marriott et al. | 123/90.12 |
| 7,685,976 B2 * | 3/2010 | Marriott | 123/90.15 |
| 7,748,353 B2 * | 7/2010 | Russell et al. | 123/90.12 |
| 8,171,900 B2 * | 5/2012 | Cowgill | 123/90.12 |
| 8,224,537 B2 | 7/2012 | Olsson et al. | |
| 8,347,836 B2 * | 1/2013 | Leone et al. | 123/90.15 |
| 8,494,742 B2 | 7/2013 | Nanua | |
| 8,602,002 B2 | 12/2013 | Brennan | |
| 2002/0177939 A1 * | 11/2002 | Kabasin | 701/110 |
| 2003/0015155 A1 | 1/2003 | Turner et al. | |
| 2003/0062019 A1 | 4/2003 | Schaefer-Siebert | |
| 2003/0172885 A1 | 9/2003 | Gaessler et al. | |
| 2006/0144356 A1 * | 7/2006 | Sellnau et al. | 123/90.16 |
| 2006/0169231 A1 * | 8/2006 | Fuwa | 123/90.15 |
| 2007/0006831 A1 * | 1/2007 | Leone et al. | 123/90.15 |
| 2007/0256651 A1 * | 11/2007 | Marriott et al. | 123/90.12 |
| 2008/0173264 A1 * | 7/2008 | Sun | 123/90.12 |
| 2009/0007866 A1 * | 1/2009 | Nakamura | 123/90.15 |
| 2009/0014672 A1 * | 1/2009 | Schiemann | 251/129.01 |
| 2009/0070016 A1 * | 3/2009 | Rayl | 701/105 |
| 2009/0229562 A1 * | 9/2009 | Ramappan et al. | 123/295 |
| 2009/0229563 A1 * | 9/2009 | Rayl et al. | 123/295 |
| 2009/0277407 A1 * | 11/2009 | Ezaki | 123/90.15 |
| 2010/0192925 A1 * | 8/2010 | Sadakane | 123/520 |
| 2010/0307433 A1 * | 12/2010 | Rust et al. | 123/90.12 |
| 2011/0073069 A1 * | 3/2011 | Marriott et al. | 123/406.12 |
| 2011/0144894 A1 * | 6/2011 | Marriott et al. | 701/113 |
| 2011/0197833 A1 * | 8/2011 | Vorih et al. | 123/90.12 |
| 2012/0031373 A1 * | 2/2012 | Brennan | 123/436 |
| 2012/0097121 A1 * | 4/2012 | Brennan et al. | 123/90.12 |
| 2012/0168654 A1 * | 7/2012 | Marriott | 251/129.01 |

* cited by examiner

SYSTEM AND METHOD FOR CONTROLLING HYDRAULIC PRESSURE IN ELECTRO-HYDRAULIC VALVE ACTUATION SYSTEMS

STATEMENT OF GOVERNMENT RIGHTS

This invention was produced pursuant to U.S. Government Contract No. DE-FC26-05 NT42415 with the Department of Energy (DoE). The U.S. Government has certain rights in this invention.

CROSS-REFERENCE TO RELATED APPLICATIONS

This application is related to U.S. Pat. No. 6,886,510 filed on Apr. 2, 2003 and issued on May 3, 2005. The disclosure of the above application is incorporated herein by reference in its entirety.

FIELD

The present disclosure relates to internal combustion engines and more particularly to a system and method for controlling hydraulic pressure in electro-hydraulic valve actuation (EHVA) systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an inlet system that may be regulated by a throttle. The air in the intake manifold may be distributed to a plurality of cylinders through a plurality of intake valves, respectively. The air may be combined with fuel to create an air/fuel (A/F) mixture. The A/F mixture may be combusted within the cylinders to drive pistons that rotatably turn a crankshaft generating drive torque. Exhaust gas resulting from combustion may be expelled from the cylinders through a plurality of exhaust valves, respectively, and into an exhaust manifold.

The intake and exhaust valves may be actuated by one or more camshafts. Alternatively, however, the intake and exhaust valves may be electrically controlled using hydraulic actuators ("electro-hydraulic" control). The electro-hydraulic control of intake and exhaust valves of an engine may be referred to as electro-hydraulic valve actuation (EHVA). Therefore, an EHVA engine may not include camshafts (i.e., a cam-less engine). More specifically, an EHVA system may control hydraulic pressure (i.e., pressure of a hydraulic fluid) to selectively engage/disengage hydraulic actuators that enable/disable intake and/or exhaust valves.

SUMMARY

A control system for an engine includes a first lift control module and a second lift control module. The first lift control module increases lift of M valves of the engine to a predetermined valve lift during a period before disabling or re-enabling N valves of the engine. The second lift control module decreases the lift of the M valves to a desired valve lift during a period after enabling or re-enabling the N valves of the engine, wherein N and M are integers greater than or equal to one.

A method includes increasing lift of M valves of an engine to a predetermined valve lift during a period before disabling or re-enabling N valves of the engine, and decreasing the lift of the M valves to a desired valve lift during a period after enabling or re-enabling the N valves of the engine, wherein N and M are integers greater than or equal to one.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
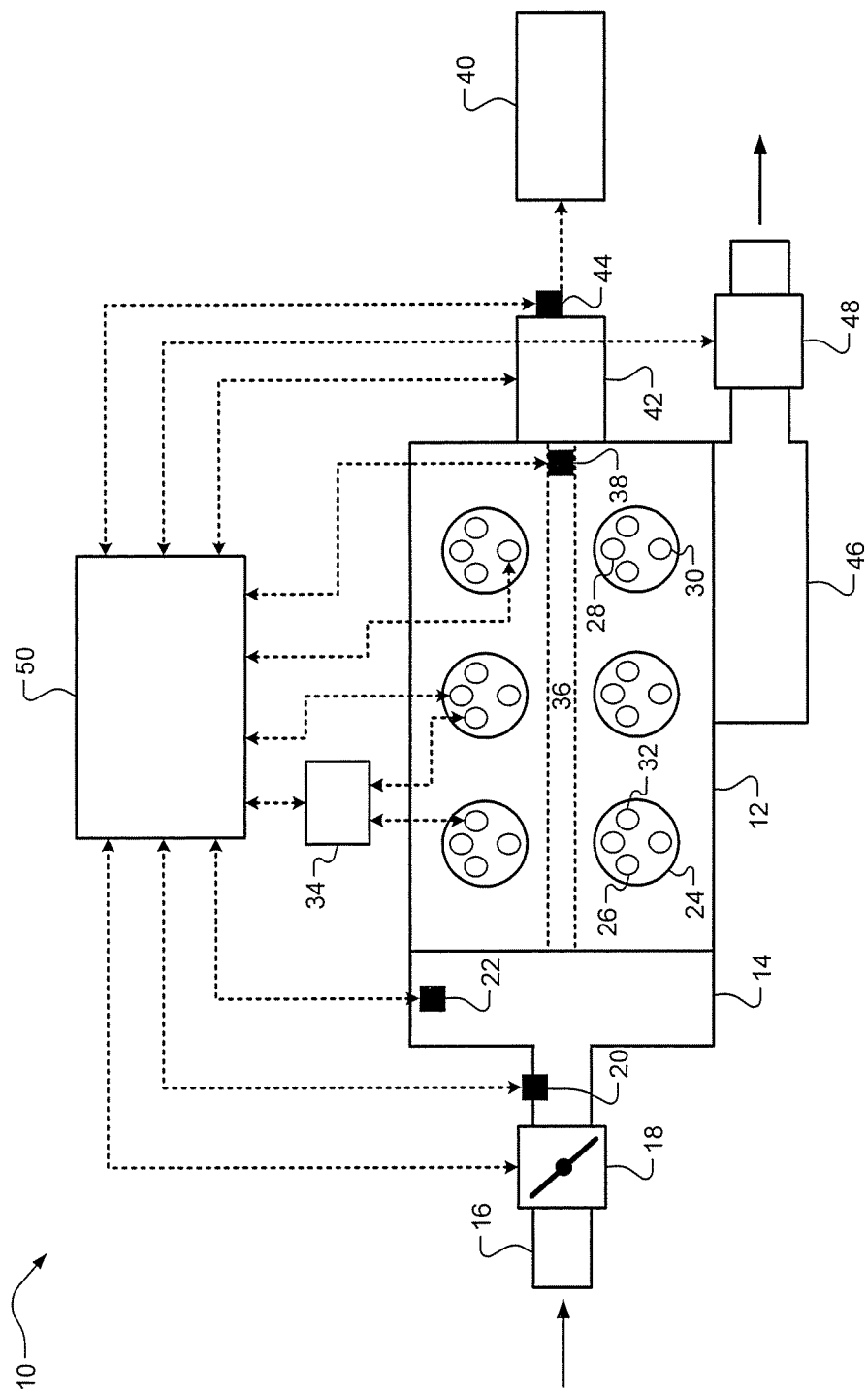
FIG. 1 is a functional block diagram of an exemplary engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Internal combustion engines may control intake and exhaust valves using electro-hydraulic valve actuation (EHVA). More specifically, EHVA systems may operate by electrically controlling hydraulic actuators that actuate the intake and/or exhaust valves. Operation of EHVA systems (i.e., the hydraulic actuators), however, may be limited based on hydraulic pressure (e.g., oil pressure). In other words, EHVA systems may have a hydraulic pressure operating range (e.g., between first and second thresholds). During valve deactivation and/or reactivation, however, the hydraulic pressure may fluctuate outside of the hydraulic pressure operating range.

Conventional control systems wait for the hydraulic pressure to stabilize before proceeding with a requested valve deactivation or reactivation operation. In other words, conventional control systems may wait for the hydraulic pressure to remain within the hydraulic pressure operating range for a period before proceeding with the requested valve deactivation or reactivation operation. Conventional control systems, therefore, may suffer from slow response to valve deactivation and reactivation requests. For example, the slow response may result in decreased performance, combustion problems, and/or damage to components of the engine.

Accordingly, a system and method are presented for improved control and response of an EHVA system. The system and method may control valve lift to prevent the hydraulic pressure from fluctuating outside of the hydraulic pressure operating range. More specifically, a volume of hydraulic fluid (e.g., oil) used—and thus the hydraulic pressure—is a function of the commanded valve lift. Therefore, the system and method may increase lift of M valves to a predetermined valve lift when enabling or disabling N valves. For example, an engine may include X total valves and X may include a sum of N and M. Additionally, for example, N may equal M (e.g., half of the valves may be disabled).

The system and method may then decrease the lift of the M valves to a desired valve lift. For example, the desired valve lift may be based on driver input and/or operating parameters (e.g., mass air flow, or MAF rate, engine speed, etc.). Additionally, for example, the predetermined valve lift may be twice the desired valve lift. Increasing the lift of the M valves to the predetermined valve lift may decrease the hydraulic pressure thus preventing the hydraulic pressure from exceeding the desired operating range. Similarly, decreasing the lift of the M valves to the desired valve lift may increase (and stabilize) the hydraulic pressure thus preventing the hydraulic pressure from falling below the desired operating range.

Referring now to FIG. 1, an engine system 10 includes an engine 12. For example, the engine 12 may include a spark ignition (SI) engine, a compression ignition (CI) engine (e.g., a diesel engine), or a homogeneous charge compression ignition (HCCI) engine. The engine 12, however, may also include a different type of engine and/or additional components, such as in a hybrid engine system (e.g., an electric motor, a battery system, a generator, etc.).

The engine 12 draws air into an intake manifold 14 through an intake system 16 that may be regulated by a throttle 18. For example, the throttle 18 may be electrically controlled (e.g., electronic throttle control, or ETC). A mass air flow (MAF) sensor 20 may measure a rate of air flow into the intake manifold 14. For example, the measurement of the MAF sensor 20 may indicate a load on the engine 12. Additionally, an intake manifold absolute pressure (MAP) sensor 22 may measure a pressure of the air in the intake manifold 14. The air in the intake manifold 14 may be distributed to a plurality of cylinders 24 through a plurality of intake valves 26, respectively. While six cylinders are shown, the engine 12 may include other numbers of cylinders.

The air may be combined with fuel from a plurality of fuel injectors 28 to create an air/fuel (A/F) mixture. For example, the fuel injectors 28 may inject the fuel via intake ports of the cylinders 24, respectively (e.g., port fuel injection) or directly into the cylinders 24, respectively (e.g., direct fuel injection). Additionally, for example, the fuel injectors 28 may inject the fuel at different times depending on the type of engine. The A/F mixture in the cylinders 24 may be compressed by pistons (not shown) and ignited by a plurality of spark plugs 30, respectively (e.g., SI engines or HCCI engines using spark assist). The air in the cylinders 24, however, may also be compressed by the pistons (not shown) and combusted by injecting the fuel into the pressurized air (e.g., CI engines, such as diesel engines).

The pistons (not shown) rotatably turn a crankshaft 36 generating drive torque. An engine speed sensor 38 may measure a rotational speed of the crankshaft 36 (e.g., in revolutions per minute, or RPM). The drive torque may be transferred to a driveline 40 (e.g., wheels) of the vehicle via a transmission 42. Additionally, for example, the transmission 42 may be coupled to the crankshaft 36 via a fluid coupling such as a torque converter. A transmission output shaft speed (TOSS) sensor 44 may measure a rotational speed of an output shaft of the transmission 42 (e.g., in RPM). For example, the measurement of the TOSS sensor 44 may indicate a speed of the vehicle.

Exhaust gas resulting from combustion may be expelled from the cylinders 24 through a plurality of exhaust valves 32, respectively, and into an exhaust manifold 46. Specifically, the intake and exhaust valves 26, 32 may be controlled (i.e., disabled or re-enabled) by hydraulic actuators 34. In other words, the hydraulic actuators 34 may be electrically controlled to selectively actuate (i.e., lift) the intake and exhaust valves 26, 32. The exhaust gas in the exhaust manifold 46 may then be treated by an exhaust treatment system 48 before being released into the atmosphere. The exhaust gas, however, may also be recycled, such as into the intake manifold 14 via an exhaust gas recirculation (EGR) system or to power a turbocharger (not shown). The engine 12, however, may also include other types of forced induction (e.g., a supercharger).

A control module 50 communicates with and controls various components of the engine system 10. Specifically, the control module 50 may receive signals from the throttle 18, the MAF sensor 20, the MAP sensor 22, the fuel injectors 28, the spark plugs 30, the hydraulic actuators 34, the engine speed sensor 38, the transmission 42, the TOSS sensor 44, and/or the exhaust treatment system 48. The control module 50 may control the throttle 18 (e.g., ETC), the intake and exhaust valves 26, 32 (by controlling the hydraulic actuators 34), the fuel injectors 28, the spark plugs 30, the transmission 42, and/or the exhaust treatment system 48. Additionally, the control module 50 may communicate with and/or control other components (e.g., an EGR system, a turbocharger or a supercharger, etc.). The control module 50 may also implement the system or method of the present disclosure.

Figure 2:
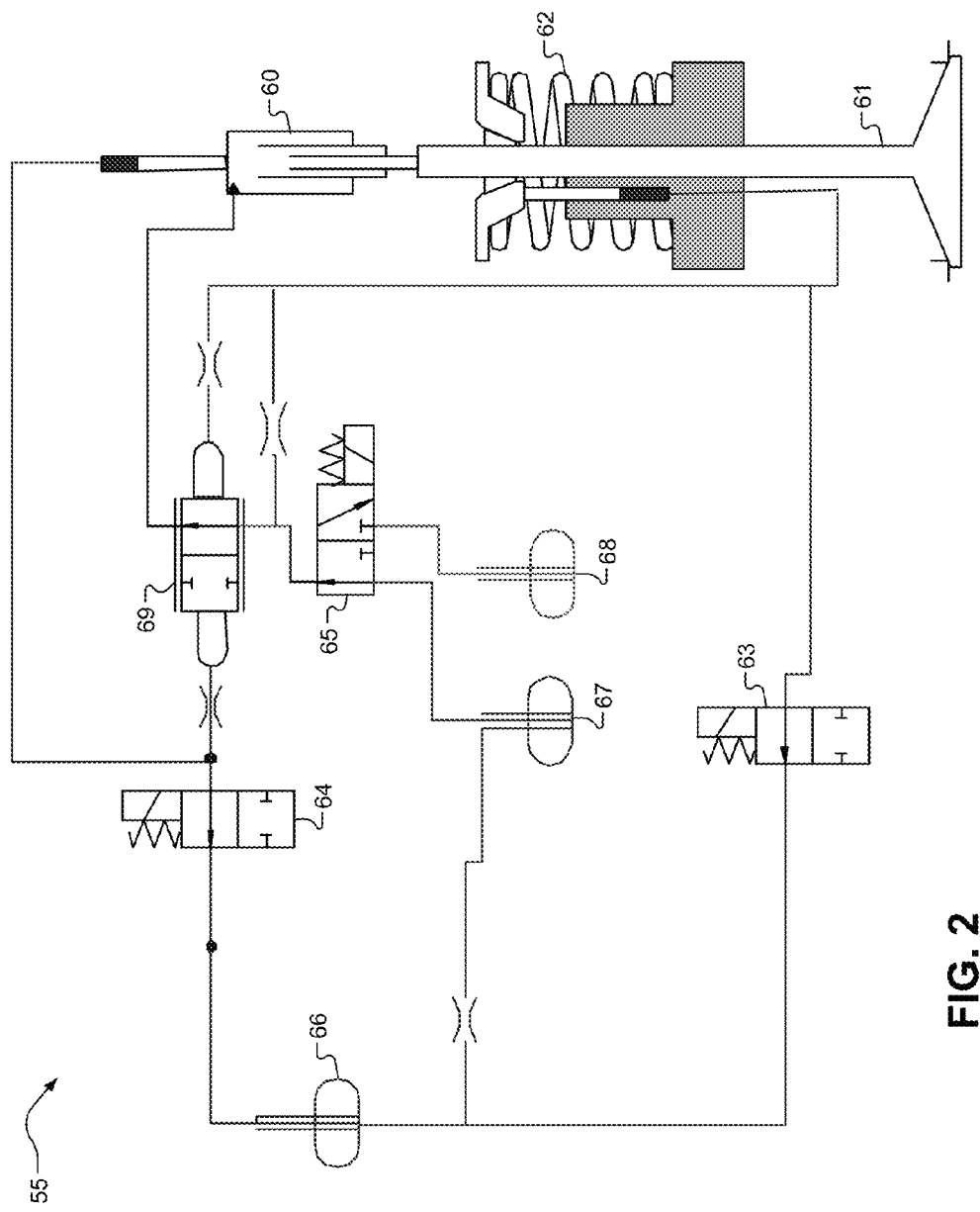
FIG. 2 is a schematic of an exemplary electro-hydraulic actuated valve according to the present disclosure.

Referring now to FIG. 2, an exemplary electro-hydraulic actuated valve 55 is shown. For example, the electro-hydraulic actuated valve 55 may include one of the hydraulic actuators 34 and one of the intake or exhaust valves 26, 32. The electro-hydraulic actuated valve 55 includes a hydraulic actuator 60, a valve 61, and a return spring 62. Specifically, the hydraulic actuator 60 is selectively energized by controlling hydraulic fluid pressure to open/close the valve 61. The valve 61 may be locked by trapping the hydraulic fluid (i.e., maintaining a constant hydraulic pressure). The return spring 62 may assist the valve 61 in returning to a closed position (i.e., when the actuator 60 is de-energized).

The electro-hydraulic actuated valve 55 also includes first, second, and third solenoids 63-65, respectively. For example, the first and second solenoids 63, 64 may include two-way solenoids and the third solenoid 65 may include a three-way solenoid. The first, second, and third solenoids are electrically controlled (e.g., via the control module 50) to control the hydraulic fluid pressure and thus control the hydraulic actuator 60 and the valve 61. Additionally or alternatively, the electro-hydraulic actuated valve 55 may include an internal feedback system (IFS) 69 for controlling the hydraulic fluid flow/pressure and thus controlling the hydraulic actuator 60 and the valve 61.

Specifically, the control module 50 may selectively actuate combinations of the first, second, and/or third solenoids 63-65 to allow hydraulic fluid flow (and thus hydraulic pressure) from first, second, and third hydraulic fluid rails 66-68, respectively. For example, the first hydraulic fluid rail 66 may include a low pressure rail (e.g., less than a first threshold), the third hydraulic fluid rail 68 may include a high pressure rail (e.g., greater than a second threshold), and the second hydraulic fluid rail may include a mid-pressure (i.e., base pressure) rail (e.g., between the first and second thresholds, or rather a pressure between the low and high pressure rails).

Figure 3:
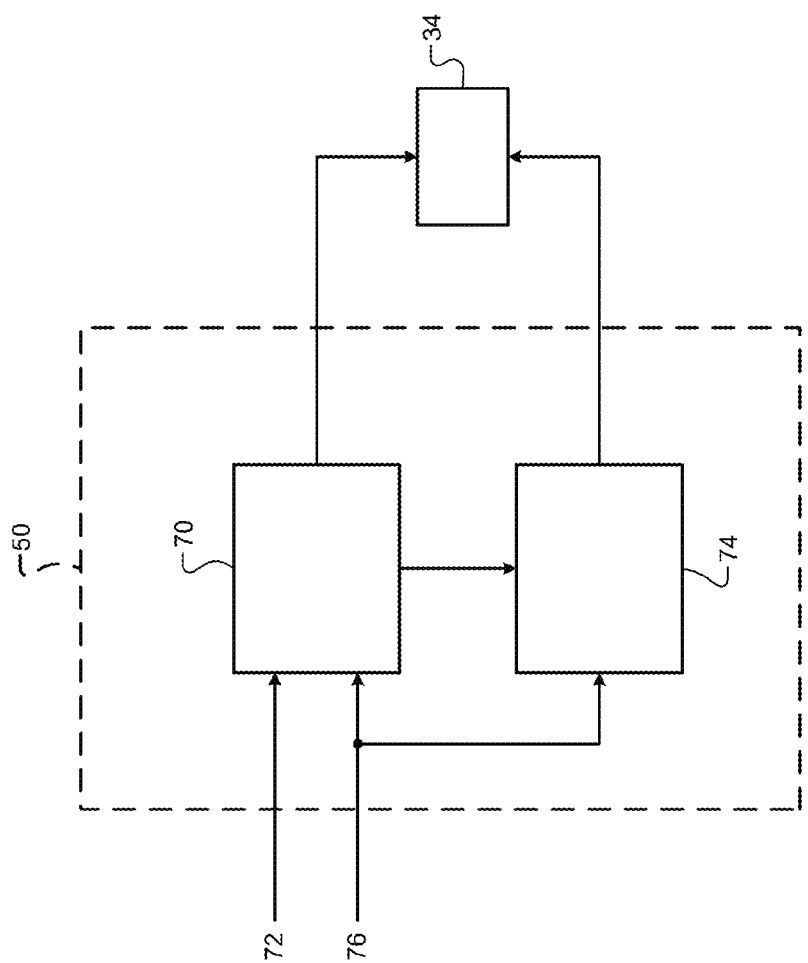
FIG. 3 is a functional block diagram of an exemplary control module according to the present disclosure.

Referring now to FIG. 3, the control module 50 is shown in more detail. The control module 50 may include first lift control module 70 and a second lift control module 74. The control module 50 may also include memory (not shown) for storing determined and/or predetermined parameters. For example, the memory (not shown) may include non-volatile memory (NVM).

The first lift control module 70 receives a signal 72 indicating a request to disable or re-enable N valves of the engine 12 and a signal 76 indicating a desired valve lift. For example, the request to disable or re-enable N valves of the engine 12 (and the value of N) may be based on engine load (e.g., MAF). Additionally or alternatively, for example, the desired valve lift may be based on driver input (e.g., via an accelerator) and/or other operating parameters (e.g., MAP, engine speed, etc.).

The first lift control module 70 may control the lift of a remaining M of the intake and/or exhaust valves 26, 32 (via the hydraulic actuators 34) based on the signal 72. In other words, the engine 12 may include [(N+M)/2] total cylinders. For example only, N may equal M (i.e., deactivation of half of the cylinders 24). More specifically, the first lift control module 70 may increase the lift to a predetermined valve lift. For example, the predetermined valve lift may be twice the desired valve lift (e.g., $lift_{des} \times 2$). The first lift control module 70 may then notify the second lift control module 74 (e.g., via a notification signal) that the valve lift has been increased to the predetermined valve lift.

The second lift control module 74 receives the notification (e.g., a notification signal) from the first lift control module 70. The second lift control module 74 also receives signal 76 indicating the desired valve lift. The second lift control module 74 may control the lift of the M intake and/or exhaust valves 26, 32 (via the hydraulic actuators 34) based on the notification signal. More specifically, the second lift control module 74 may decrease the lift from the predetermined valve lift to the desired valve lift during a period after receiving the notification signal from the first lift control module 70. For example, the second lift control module 74 may ramp the lift down to the desired valve lift during the period.

Figure 4:
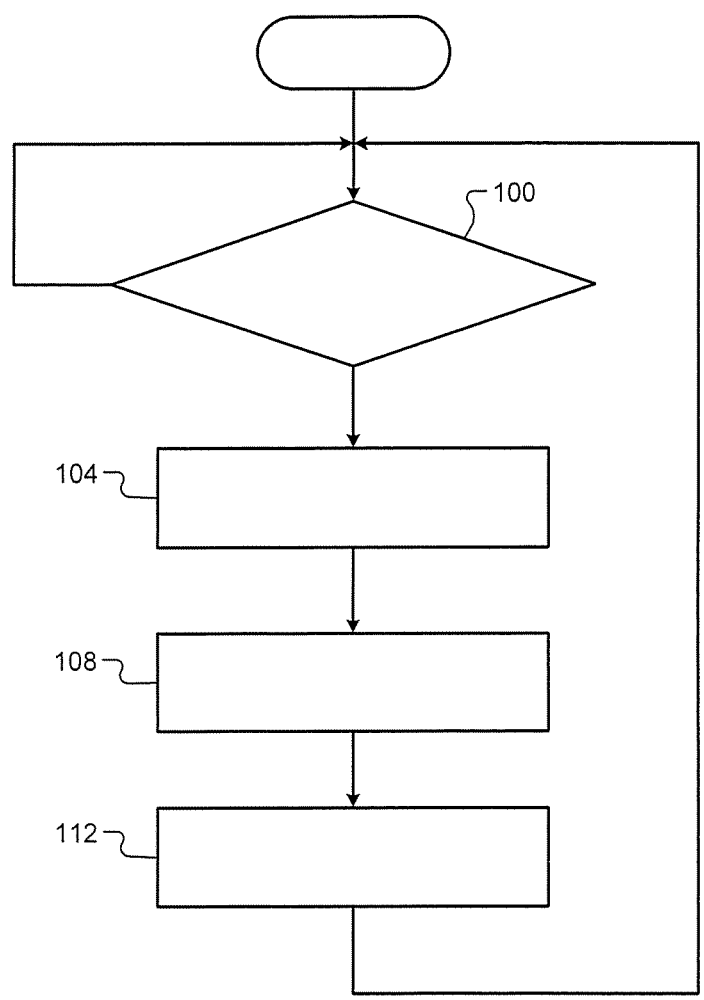
FIG. 4 is a flow diagram of a first exemplary method for controlling hydraulic pressure in an electro-hydraulic valve actuation (EHVA) system according to the present disclosure.

Referring now to FIG. 4, a method for controlling an EHVA system begins at 100. At 100, the control module 50 may determine whether valve disablement or re-enablement has been requested (and if so, a number of valves N). If true, control may proceed to 104. If false, control may return to 100. At 104, the control module 50 may determine the desired valve lift.

At 108, the control module 50 may increase the lift of the remaining M of the intake and/or exhaust valves 26, 32 to the predetermined valve lift (e.g., twice the desired valve lift). At 112, the control module 50 may decrease the lift of the M intake and/or exhaust valves 26, 32 to the desired valve lift. For example, the control module 50 may ramp the lift down to the desired valve lift during a next engine cycle. Control may then return to 100.

Figure 5:
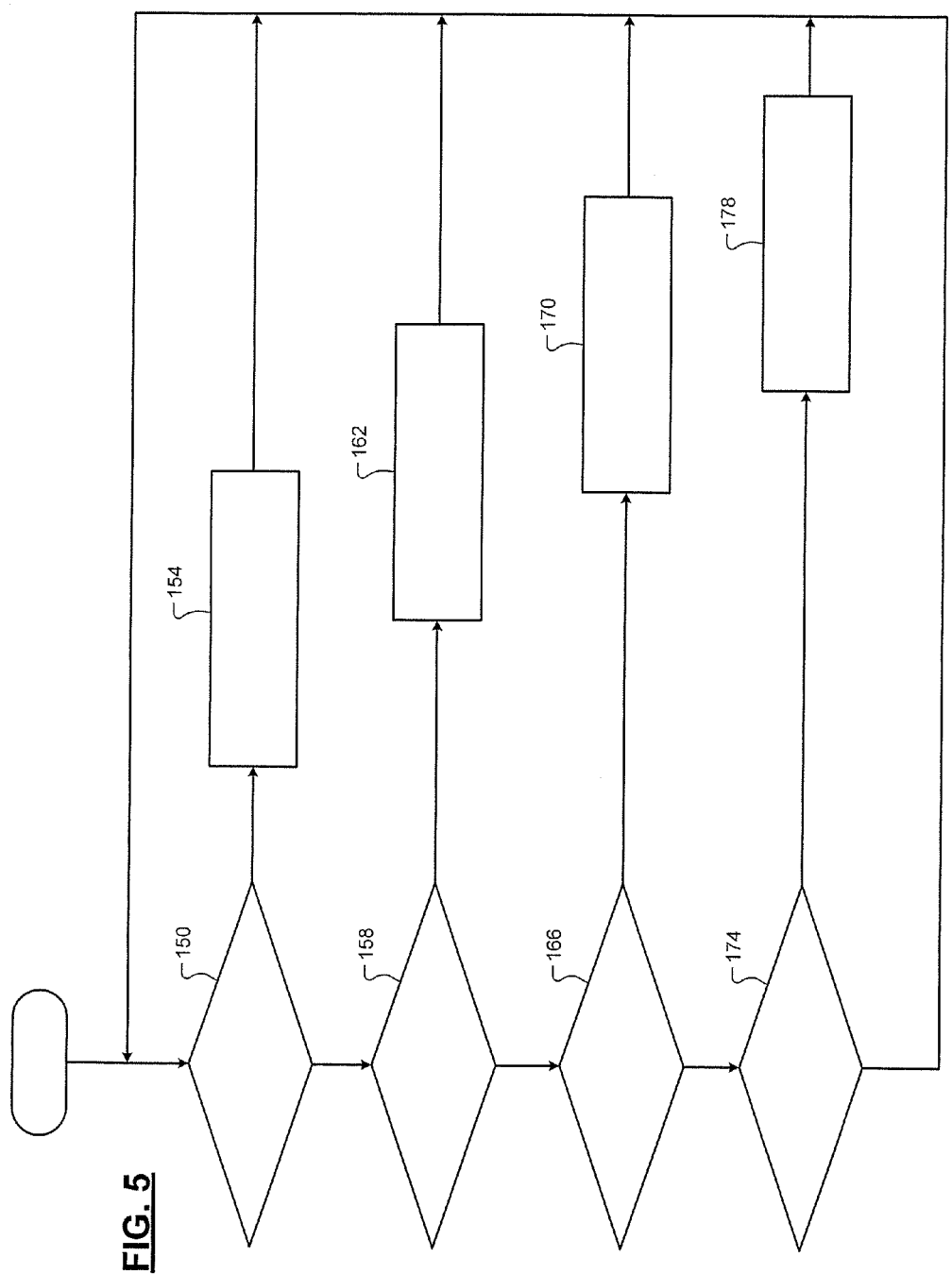
FIG. 5 is a flow diagram of a second exemplary method for controlling hydraulic pressure in an EHVA system by controlling valve lift according to the present disclosure.

Referring now to FIG. 5, a method for controlling the EHVA system begins at 150. At 150, the control module 50 determines whether N valves are to be disabled during a current engine cycle. If true, control may proceed to 154. If false, control may proceed to 158. At 154, the control module may temporarily (e.g., during a predetermined period) increase the valve lift of M enabled valves to double a normal (i.e., desired) valve lift. Control may then return to 150. For example only, M may equal N (i.e., disabling or reactivating half of the valves of the engine 12).

At 158, the control module 50 determines whether the N valves were disabled during a previous engine cycle. If true, control may proceed to 162. if false, control may proceed to 166. At 162, the control module 50 may ramp the valve lift of the M enabled valves from the doubled valve lift down to the desired valve lift. Control may then return to 150.

At 166, the control module 50 determines whether the N valves are to be reactivated within a next predetermined number of engine cycles. If true, control may proceed to 170. If false, control may proceed to 174. At 170, the control module 50 may temporarily ramp the valve lift of the M enabled valves to double the desired valve lift. Control may then return to 150.

At 174, the control module 50 determines whether the N valves are to be reactivated during the current engine cycle. If true, control may proceed to 178. If false, control may return to 150. At 178, the control module 50 may command the valve lift of all the valves to the desired valve lift. Control may then return to 150.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine, comprising:
   a first electronic circuit configured to increase lift of M valves of the engine to a predetermined valve lift during a first period before disabling N valves of the engine in response to a request to disable the N valves of the engine; and
   a second electronic circuit configured to decrease the lift of the M valves to a desired valve lift during a second period after disabling the N valves of the engine and before re-enabling the N valves, wherein:
   N and M are integers greater than or equal to one; and
   the predetermined valve lift is greater than the desired valve lift.

2. The control system of claim 1, wherein the engine includes X exhaust valves, and wherein X equals a sum of M and N.

3. The control system of claim 2, wherein M equals N.

4. The control system of claim 1, wherein the engine includes hydraulic actuators that actuate the valves of the engine.

5. The control system of claim 4, wherein each of the hydraulic actuators is selectively engaged based on hydraulic pressure, and wherein the hydraulic pressure is controlled using three solenoids and three hydraulic fluid rails.

6. The control system of claim 5, wherein the three solenoids include two two-way solenoids and one three-way solenoid, and wherein the three hydraulic fluid rails have low, medium, and high pressures.

7. The control system of claim 1, wherein the second period includes a next engine cycle after increasing the lift of the M valves to the predetermined valve lift.

8. The control system of claim 1, wherein the desired valve lift is determined based on at least one of driver input and a plurality of operating parameters.

9. The control system of claim 8, wherein the driver input includes a position of an accelerator, and wherein the plurality of operating parameters includes mass air flow (MAF) rate into the engine and engine speed.

10. A method, comprising:
increasing lift of M valves of an engine to a predetermined valve lift during a first period before disabling N valves of the engine in response to a request to disable the N valves of the engine; and
decreasing the lift of the M valves to a desired valve lift during a second period after disabling the N valves of the engine and before re-enabling the N valves, wherein:
N and M are integers greater than or equal to one; and
the predetermined valve lift is twice the desired valve lift.

11. The method of claim 10, wherein the engine includes X exhaust valves, and wherein X equals a sum of M and N.

12. The method of claim 11, wherein M equals N.

13. The method of claim 10, wherein the engine includes hydraulic actuators that actuate the valves of the engine.

14. The method of claim 13, further comprising selectively engaging each of the hydraulic actuators based on hydraulic pressure, and wherein the hydraulic pressure is controlled using three solenoids and three hydraulic fluid rails.

15. The method of claim 14, wherein the three solenoids include two two-way solenoids and one three-way solenoid, and wherein the three hydraulic fluid rails have low, medium, and high pressures.

16. The method of claim 10, wherein the second period includes a next engine cycle after increasing the lift of the M valves to the predetermined valve lift.

17. The method of claim 10, wherein the desired valve lift is determined based on at least one of driver input and a plurality of operating parameters.

18. The method of claim 17, wherein the driver input includes a position of an accelerator, and wherein the plurality of operating parameters includes mass air flow (MAF) rate into the engine and engine speed.

19. The control system of claim 1, wherein the first and second electronic circuits include at least one of an Application Specific Integrated Circuit (ASIC), a processor and memory including one or more programs, and a combinational logic circuit.

* * * * *